(12) United States Patent
Angermayer

(10) Patent No.: US 10,545,813 B2
(45) Date of Patent: Jan. 28, 2020

(54) DATABASE DIAGNOSTIC ENGINE

(71) Applicant: SAP SE, Walldorf (DE)

(72) Inventor: Thomas Angermayer, Stetten (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 15/838,039

(22) Filed: Dec. 11, 2017

(65) Prior Publication Data

US 2019/0179688 A1 Jun. 13, 2019

(51) Int. Cl.
*G06F 11/07* (2006.01)
*H04L 29/08* (2006.01)
*H04L 29/06* (2006.01)

(52) U.S. Cl.
CPC ........ *G06F 11/079* (2013.01); *G06F 11/0706* (2013.01); *G06F 11/0751* (2013.01); *G06F 11/0769* (2013.01); *H04L 67/36* (2013.01); *H04L 67/42* (2013.01)

(58) Field of Classification Search
CPC .............. G06F 11/079; G06F 11/0706; G06F 11/0751; G06F 11/0769
USPC .......................................................... 714/37
See application file for complete search history.

(56) References Cited

U.S. PATENT DOCUMENTS

| | | | | |
|---|---|---|---|---|
| 7,385,716 B1 * | 6/2008 | Skaanning | .......... | G06F 11/0733 358/1.14 |
| 2002/0044296 A1 * | 4/2002 | Skaanning | .......... | G06F 11/0733 358/1.14 |
| 2009/0019310 A1 * | 1/2009 | Nastacio | ............. | G06F 11/0709 714/26 |
| 2010/0169712 A1 * | 7/2010 | Argue | ................. | G06F 11/0766 714/25 |
| 2010/0218030 A1 * | 8/2010 | Bhatnagar | ........... | G06F 11/0748 714/2 |
| 2012/0072770 A1 * | 3/2012 | Dilman | ............... | G06F 11/0727 714/15 |
| 2014/0310222 A1 * | 10/2014 | Davlos | ..................... | G06N 5/04 706/46 |

(Continued)

OTHER PUBLICATIONS

Yuan, Ding et al., "Simple Testing Can Prevent Most Critical Failures: An Analysis of Production Failures in Distributed Data-Intensive Systems", Oct. 6, 2018, 11th USENIX Symposium on Operating Systems Design and Implementation (OSDI '14), pp. 249-265 (Year: 2018).*

*Primary Examiner* — Matthew M Kim
*Assistant Examiner* — Indranil Chowdhury
(74) *Attorney, Agent, or Firm* — Mintz Levin Cohn Ferris Glovsky and Popeo, P.C.

(57) ABSTRACT

A method for performing database diagnostics may include generating, by a database diagnostic engine, a user interface for displaying, at a client, a first selection of symptoms. The database diagnostic engine may receive, from the client and via the user interface, a first input indicating that a first symptom from the first selection of symptoms is present at a database coupled with the client. The database diagnostic engine may respond to the first input by updating the user interface to enable an entry of a second input with respect to the first symptom. The second input may be received from the client via the updated user interface. The database diagnostic engine may perform, based on the first input and/or the second input, checks to detect at least one error at the database. Related systems and articles of manufacture are also provided.

20 Claims, 7 Drawing Sheets

(56) References Cited

U.S. PATENT DOCUMENTS

2015/0019497 A1\* 1/2015 Bostock .............. G06F 11/0727
707/687
2017/0371735 A1\* 12/2017 Gadi ................... G06F 11/0769

\* cited by examiner

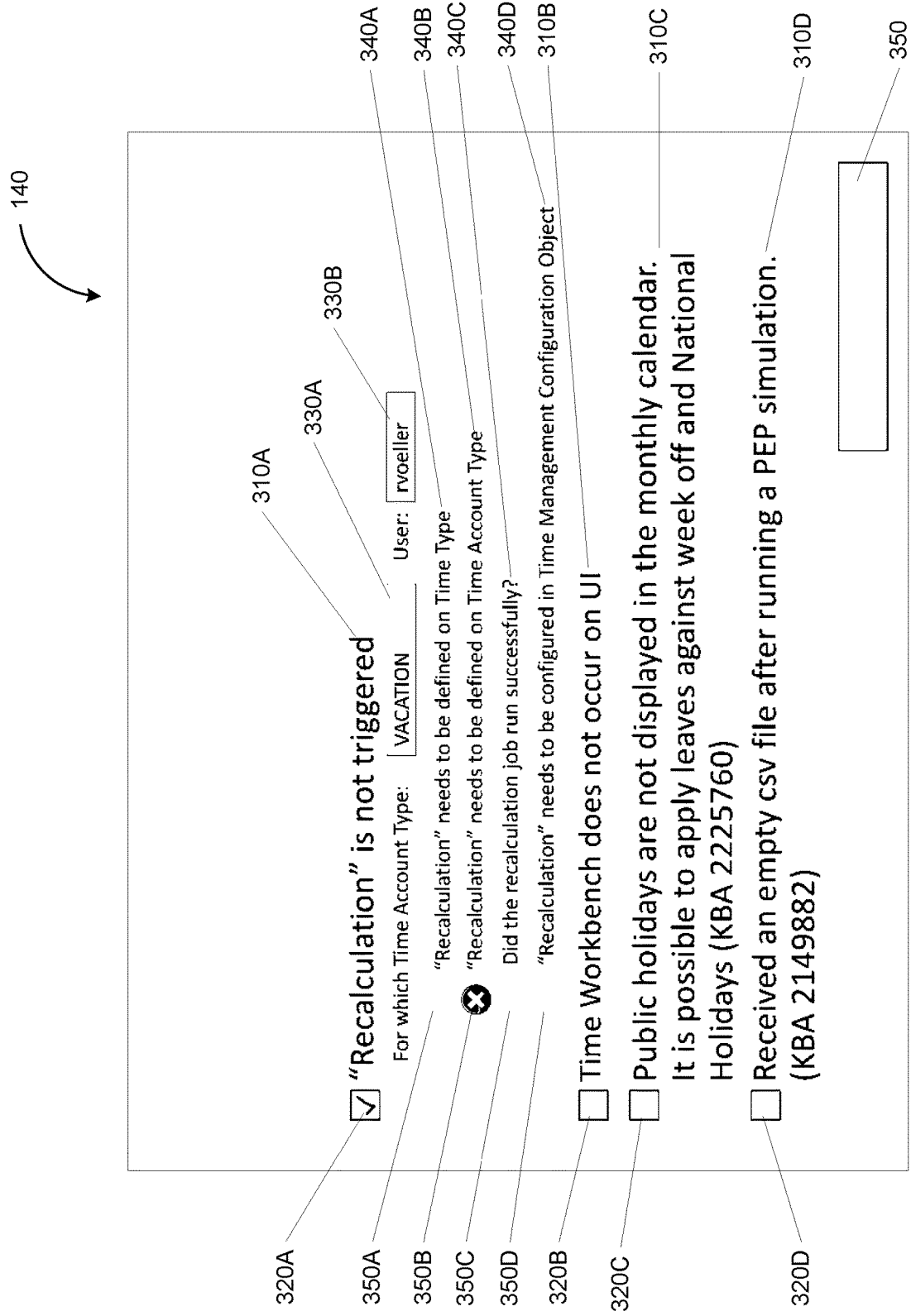

DATABASE DIAGNOSTIC ENGINE

TECHNICAL FIELD

The subject matter described herein relates generally to database processing and more specifically to a database diagnostic engine.

BACKGROUND

A database may be configured to store a plurality of electronic data records. These data records are organized, in accordance with a database schema, into various database objects including, for example, one or more database tables. The database is coupled with a database management system (DBMS) that supports a variety of operations for accessing the data records held in the database. These operations may include, for example, structured query language (SQL) queries.

SUMMARY

Systems, methods, and articles of manufacture, including computer program products, are provided for database diagnostics. In one aspect, there is provided a system. The system may include at least one data processor and at least one memory. The at least one memory may store instructions that result in operations when executed by the at least one data processor. The operations may include: generating, by a database diagnostic engine, a user interface for displaying, at a client, a first selection of symptoms; receiving, from the client and via the user interface, a first input indicating that a first symptom from the first selection of symptoms is present at a database coupled with the client; responding, by the database diagnostic engine, to the first input by at least updating the user interface to enable an entry of a second input with respect to the first symptom; receiving, from the client and via the updated user interface, the second input with respect to the first symptom; and performing, by the database diagnostic engine, one or more checks, the one or more checks being performed, based at least on the first input and/or the second input, to detect at least one error at the database.

In some variations, one or more features disclosed herein including the following features can optionally be included in any feasible combination. The user interface may be updated to display a second selection of symptoms. The second input may include a selection of at least a second symptom from the second selection of symptoms. The second symptom may be an additional symptom that is also present at the database along with the first symptom. The one or more checks may be selected based at least on the one or more checks being configured to detect an error associated with the first symptom and/or the second symptom.

In some variations, the second input may include one or more parameters associated with the first symptom. The one or more parameters may be a string, an integer, a Boolean, a date, a time, and/or a real number. The one or more checks may be selected based at least on the one or more checks being configured to detect an error associated the first symptom having the one or more parameters.

In some variations, the user interface may include a graphic user interface and/or a chatbot. The user interface may include one or more checkboxes, text boxes, drop down menus, radio buttons, and/or buttons for receiving the first input.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3C depicts a user interface for performing database diagnostics, in accordance with some example embodiments;

DETAILED DESCRIPTION

A database may malfunction due to a variety of errors including, for example, data inconsistencies, misconfigurations, and/or the like. Troubleshooting a malfunctioning database typically requires extensive resources. For instance, a team of information technology (IT) professionals may be deployed in order to diagnose and correct the underlying errors. Meanwhile, the database may be offline for the duration of the repair, thereby causing a tremendous loss in productivity and/or revenue. As such, in some example embodiments, a database diagnostic engine may diagnose errors (e.g., data inconsistencies, misconfigurations, and/or the like) that cause a database to malfunction. Furthermore, the database diagnostic engine may identify remedial actions for correcting the errors. In doing so, the database diagnosis engine may minimize the time and resources required to repair the malfunctioning database.

Figure 1:
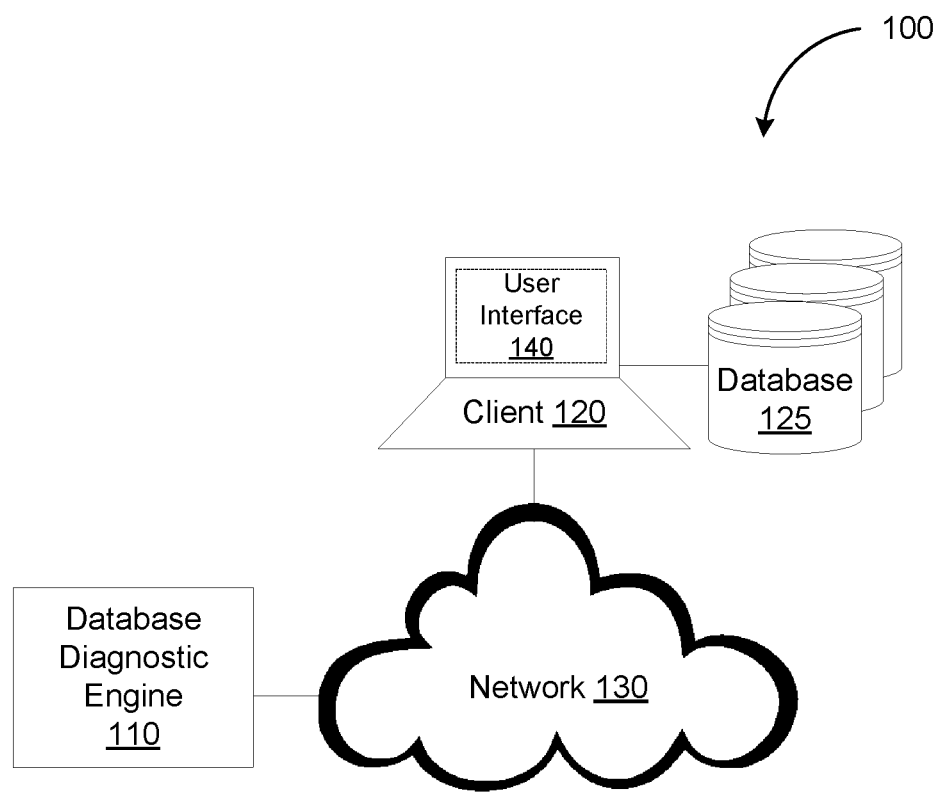
FIG. 1 depicts a system diagram illustrating a database diagnostic system, in accordance with some example embodiments.

FIG. 1 depicts a system diagram illustrating a database diagnostic system 100, in accordance with some example embodiments. Referring to FIG. 1, the database diagnostic system 100 may include a database diagnostic engine 110 configured to diagnose errors at a database 125 that may cause the database 125 to malfunction including, for example, data inconsistencies, misconfigurations, and/or the like. The database diagnostic engine 110 may be further configured to identify remedial actions for correcting the errors at the database 125.

As shown in FIG. 1, the database 125 may be coupled with a client 120. For instance, the client 120 may be a database management system (DBMS) supporting a variety of operations (e.g., structured query language (SQL) queries) for accessing the data stored in the database 125. It should be appreciated that the database 125 may be any type of database including, for example, an in-memory database, a relational database, a non-SQL (NoSQL) database, and/or the like.

In some example embodiments, a client 120 may access the database diagnostic engine 110 remotely via a network 130. The client 120 may be any type of processor-based device including, for example, a desktop computer, a tablet computer, a mobile device, a wearable device, and/or the like. The network 130 may be any wired and/or wireless network including, for example, a wide area network (WAN), a local area network (LAN), a public land mobile network (PLMN), the Internet, and/or the like. As such, one or more functionalities of the database diagnostic engine 110 may be available as a web application and/or a cloud-based service. Alternatively and/or additionally, the database diagnostic engine 110 may be deployed locally at the client 120 as, for example, computer software (e.g., a mobile application and/or the like), dedicated circuitry (e.g., application specific integrated circuits (ASICs) and/or the like), and/or the like. The functionalities of the database diagnostic engine 110 may also be integrated in application software installed at the client 120. As noted, the functionalities of the database diagnostic engine 110 may include, for example, diagnosis of errors at the database 125, identification of remedial actions for correcting the errors at the database 125, and/or the like.

In some example embodiments, the database diagnostic engine 110 may be diagnose errors at the database 125 based on inputs from a user at the client 120. In order to receive inputs from the user at the client 120, the database diagnostic engine 110 may generate a user interface 140, which may be a graphic user interface displayed at the client 120. The user may provide, via the user interface 140, one or more inputs including, for example, the symptoms observed at the database 125. Alternatively and/or additionally, the database diagnostic engine 110 may receive inputs from the user at the client 120 via a chatbot. For example, the chatbot may be configured to solicit one or more inputs from the user identifying a first symptom present at the database 125. Based on the first symptom present at the database 125, the chatbot may be configured to solit additional inputs from the user including, for example, one or more parameters of the first symptom and/or an identification of a second symptom that is also present at the database 125.

As noted, the database diagnostic engine 110 may generate the user interface 140 for display at the client 120. For instance, the user interface 140 may be displayed by a web browser at the client 120. In some example embodiment, the user interface 140 may be configured to receive, from the user at the client 120, one or more inputs with respect to the symptoms observed at the database 125. For instance, the user interface 140 may include one or more checkboxes, text boxes, drop down menus, radio buttons, buttons, and/or the like that enable the entry of inputs with respect to the symptoms observed at the database 125. The symptoms observed at the database 125 may include, for example, an inability to perform a database operation, an incorrect result from performing a database operation, and/or the like.

In some example embodiments, the user interface 140 may display a first selection of symptoms. Based on the user's selection of at least a first symptom from the first selection of symptoms, the database diagnostic engine 110 may update the user interface 140 to enable the entry of parameters associated with the first symptom. These parameters may include one or more values (e.g., strings, integers, real numbers, Booleans, and/or the like) that provide additional information with respect to the first symptom. For instance, where the first symptom is an incorrect result from performing a database operation, these parameters may include the incorrect result and/or the correct result of the database operation. Alternatively and/or additionally, in response to the selection of at least the first symptom from the first selection of symptoms, the user interface 140 may be updated to display a second selection of symptoms, thereby enabling the user of the client 120 to select at least a second symptom from the second selection of symptoms. The second selection of symptoms may include additional symptoms that may accompany the first symptom. For example, where the first symptom is an inability to perform a database operation, the second symptom may be an inability to perform other database operations.

According to some example embodiments, the database diagnostic engine 110 may perform a plurality of checks in accordance with the first symptom, the parameters associated with the first symptom, and/or the second symptom. For example, the database diagnostic engine 110 may perform checks selected based on the first symptom, the parameters associated with the first symptom, and/or the second symptom. The checks may be configured to identify errors that may give rise to the first symptom, the first symptom having the specified parameters, and/or the second symptom. Errors at the database 125 including, for example, data inconsistencies, misconfigurations, and/or the like, may be identified based at least on a result of performing the plurality of checks. It should be appreciated that the user at the client 120 may be able to change and/or customize the checks performed by the database diagnostic engine 110. For example, the user at the client 120 may determine to bypass one or more checks selected by the database diagnostic engine 110 based on the first symptom, the parameters associated with the first symptom, and/or the second symptom.

Figure 2:
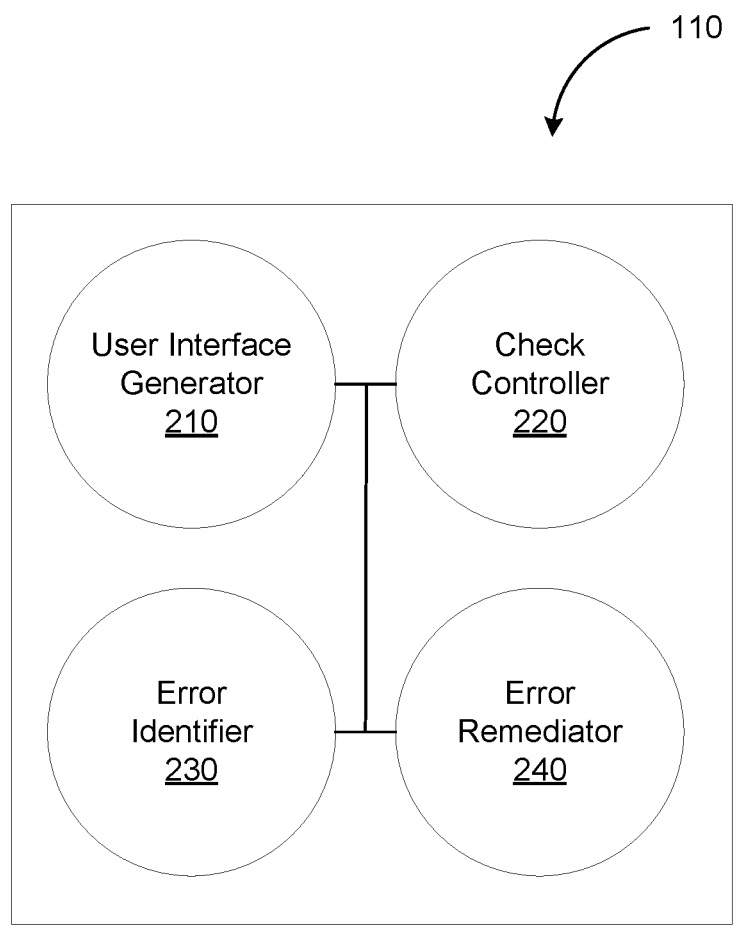
FIG. 2 depicts a block diagram illustrating a database diagnostic engine, in accordance with some example embodiments.

FIG. 2 depicts a block diagram illustrating the database diagnostic engine 110, in accordance with some example embodiments. Referring to FIGS. 1-2, the structured data validation engine 110 may include a user interface generator 210, a check controller 220, an error identifier 230, and an error remediator 240. It should be appreciated that the database diagnostic engine 110 may include additional and/or different components than shown.

In some example embodiments, the user interface generator 210 may be configured to generate and/or update one or more user interfaces including, for example, the user interface 140. As noted, the user interface 140 may be configured to receive inputs identifying one or more symptoms observed at the database 125. For example, the user interface generator 210 may generate the user interface 140 to display the first selection of symptoms. Based on the selection of the first symptom from the first selection of symptoms, the user interface generator 210 may update the user interface 140 to display the second selection of symptoms. Alternatively and/or additionally, based on the selection of the first symptom from the first selection of symptoms, the user interface generator 210 may update the user interface 140 to enable the entry of one or more parameters associated with the first symptom.

The check controller 220 may be configured to perform one or more checks based on inputs received via the user interface 140 generated by the user interface generator 210. For example, the check controller 220 may perform checks that correspond to the first symptom, the parameters associated with the first symptom, and/or the second symptom. Each check may be configured to identify one or more errors that may give rise to the first symptom, the first symptom having the specified symptoms, and/or the second symptom. The check controller 220 may perform the one or more checks by at least executing the programming code implementing each check.

In some example embodiments, the check controller 220 may be configured to perform each check once. As such, when two or more symptoms are selected and the two or more symptoms all trigger the same check, the check controller 220 may be configured to perform that check only once instead of repeating the same check for each of the two or more symptoms.

In some example embodiments, the error identifier 230 may be configured to identify the errors present at the database 125 based on a result of the checks performed by the check controller 220. Furthermore, the error remediator 240 may be configured to identify and/or perform remedial actions for correcting the errors identified by the error identifier 230. As noted, errors at the database 125 including, for example, data inconsistencies, misconfigurations, and/or the like, may cause the database 125 to malfunction. By diagnosing and/or correcting the errors, the database diagnostic engine 110 may minimize the time and resources required to repair the malfunctions at the database 125.

As noted, in some example embodiments, the database diagnostic engine 110 may generate and/or update the user interface 140, which may be configured to receive inputs associated with one or more symptoms observed at the database 125. To further illustrate, FIGS. 3A-B depicts the user interface 140 for performing database diagnostics, in accordance with some example embodiments.

Figure 3A:
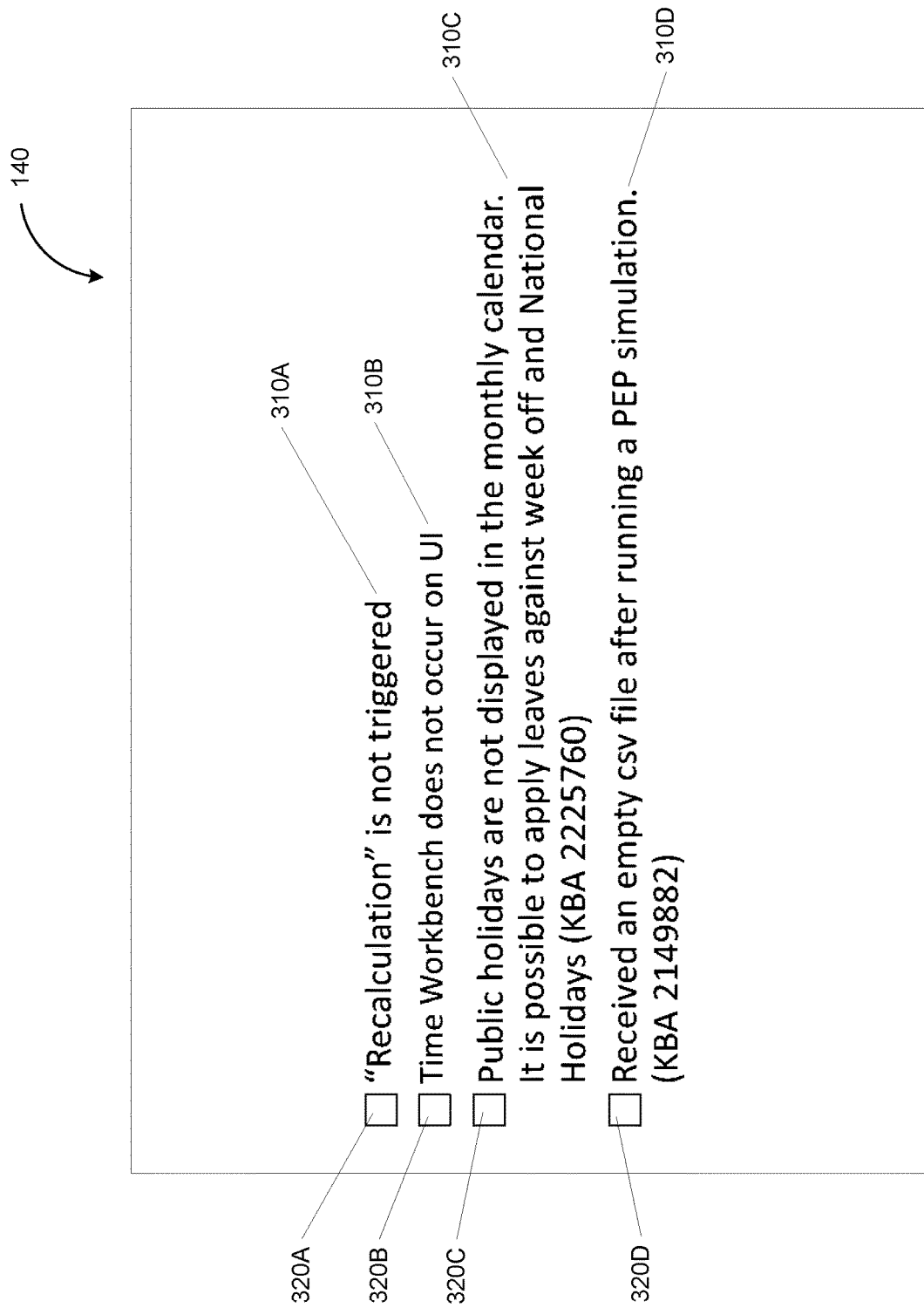
FIG. 3A depicts a user interface for performing database diagnostics, in accordance with some example embodiments.
Figure 3B:
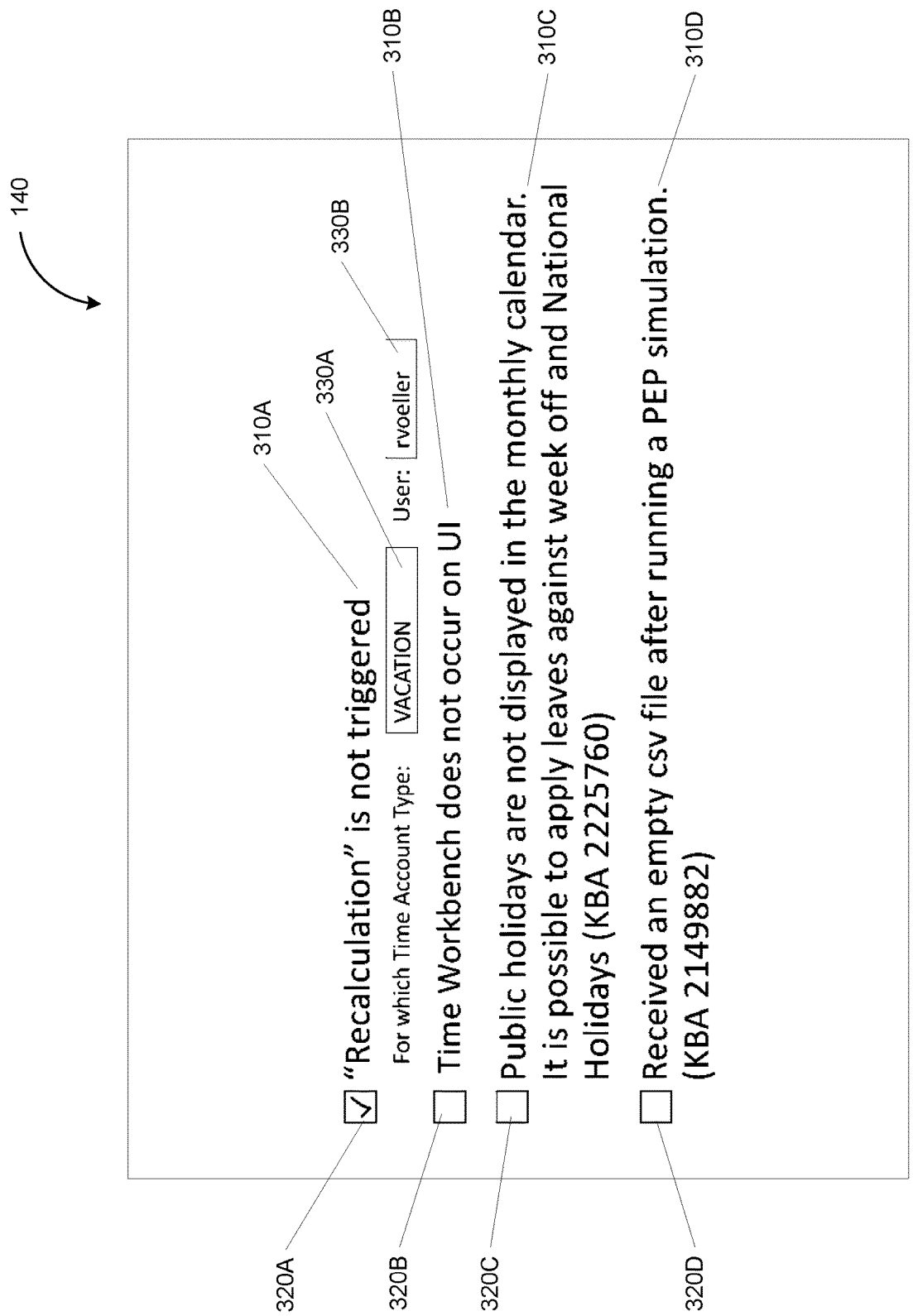
FIG. 3B depicts a user interface for performing database diagnostics, in accordance with some example embodiments.

Referring to FIG. 3A, the user interface 140 may display a first selection of symptoms that includes, for instance, a first symptom 310A, a second symptom 310B, a third symptom 310C, and/or a fourth symptom 310D. In some example embodiments, the first symptom 310A, the second symptom 310B, the third symptom 310C, and/or the fourth symptom 310D may be an inability to perform a database operation at the database 125, an incorrect result from performing a database operation at the database 125, and/or the like. For example, as shown in FIG. 3C, the first symptom 310A may be "'Recalculation' is not triggered," the second symptom 310B may be "Time Workbench does not occur on UI," the third symptom 310C may be "Public holidays are not displayed in the monthly calendar," and the fourth symptom 310D may be "Received an empty csv file after running PEP simulation."

The user interface 140 may be configured to receive one or more inputs indicating that the database 125 exhibits the first symptom 310A, the second symptom 310B, the third symptom 310C, and/or the fourth symptom 310D. For instance, as shown in FIG. 3A, the user interface 140 may include a plurality of checkboxes including, for example, a first checkbox 320A, a second checkbox 320B, a third checkbox 320C, and/or a fourth checkbox 320D. Each checkbox may be associated with a symptom such that selecting a checkbox may indicate that the corresponding symptom is present at the database 125. For example, in some example embodiments, selecting the first checkbox 320A may indicate to the database diagnostic engine 110 that the database 125 exhibits the first symptom 310A. Alternatively and/or additionally, selecting the second checkbox 320B may indicate to the database diagnostic engine 110 that the database 125 exhibits the second symptom 310B.

In some example embodiments, the database diagnostic engine 110 may update the user interface 140 in response to the selection of at least one symptom from the first selection of symptoms displayed in the user interface 140. To further illustrate, FIG. 3B depicts the user interface 140, which has been updated in response to the selection of the first checkbox 320A indicating that the first symptom 310A is present at the database 125. As shown in FIG. 3B, the database diagnostic engine 110 may respond to the selection of the first checkbox 320A by at least updating the user interface 140 to enable the entry of one or more parameters associated with the first symptom 310A. For example, the database diagnostic engine 110 may update the user interface 140 by at least displaying a first text box 330A and/or a second text box 330B. The first text box 330A and/or the second text box 330B may be configured to receive one or more inputs corresponding to parameters associated with the first symptom 310A. For instance, the parameters associated with the first symptom 310A may be values (e.g., strings, integers, Booleans, a date, a time, and/or the like) that provide additional information with respect to the first symptom 310A. These values may be populated automatically, for example, based on at least a portion of the input entered via the user interface 140. As noted, the database diagnostic engine 110 may be configured to perform one or more checks based on the selection of the first symptom 310A and/or the parameters associated with the first symptom 310A.

To further illustrate, as noted, the first symptom 310A may be "'Recalculation' is not triggered." The selection of the corresponding first checkbox 320A may cause the database diagnostic engine 110 to update the user interface 140 to enable the entry of the type of account type and the user for which recalculation is not triggered. For instance, the first text box 330A may be configured to receive an input (e.g., "VACATION") for the "Time Account Type" while the second text box 330B may be configured to receive an input (e.g., "rvoller") for the "User."

Although not shown, it should be appreciated that the database diagnostic engine 110 may also respond to the selection of the first checkbox 320A by updating the user interface 140 to display a second selection of symptoms. The second selection of symptoms may include one or more additional symptoms that may accompany the first symptom 310A. Thus, instead of and/or in addition to being updated to enable an entry of one or more parameters associated with the first symptom 310A, the user interface 140 may also be updated to enable a selection of at least one of additional symptom from the second selection of symptoms. As noted, the database diagnostic engine 110 may perform one or more checks based on the additional symptom selected from the second selection of symptoms.

In some example embodiments, the database diagnostic engine 110 may be configured to perform one or more checks based on the selection of the first symptom 310A and/or the parameters associated with the first symptom 310A. For example, as shown in FIG. 3C, the database diagnostic engine 110 may perform a first check 340A, a second check 340B, a third check 340C, and/or a fourth check 340D. Each of the plurality of first check 340A, the second check 340B, the third check 340C, and/or the fourth check 340D may be configured to identify at least one error present at the database 125 that may give rise to the first symptom 310A and/or the parameters associated with the first symptom 310A. As shown in FIG. 3C, the first check 340A may determine whether recalculation is defined on time type, the second check 340B may determine whether recalculation is defined on a time account type (e.g., "VACATION" as specified by the input provided via the first text box 330A), the third check 340C may determine whether the recalculation job was run successfully, and the fourth check 340D may determine whether recalculation was configured in Time Management Configuration Object. To perform a check, the database diagnostic engine 110 may execute the programming code implementing the check.

In some example embodiments, the database diagnostic engine 110 may further update the user interface 140 to display a result of performing each of the first check 340A, the second check 340B, the third check 340C, and/or the fourth check 340D. Here, the database diagnostic engine 110 may display an indicator configured to indicate the result (e.g., success and/or failure) of each check. For instance, the first check 340A may be associated with a first indicator 350A, the second check 340B may be associated with a second indicator 350B, the third check 340C may be associated with a third indicator 350C, and the fourth check 340D may be associated with the fourth check 350D.

As shown in FIG. 3C, the first indicator 350A, the third indicator 350B, and the fourth indicator 350C may indicate a successful completion of the first check 340A, the third check 340C, and the fourth check 340D. Successful completion of the first check 340A, the third check 340C, and the fourth check 340D may indicate that the corresponding errors are not present at the database 125 and are therefore not the cause of the first symptom 310A. Meanwhile, the second indicator 350B may indicate a failure of the second check 340B. Accordingly, the database diagnostic engine 110 may determine that the corresponding error is present at the database 125 and is the cause of the first symptom 310A. That is, based on the failure of the second check 340B, the database diagnostic engine 110 may determine that the reason why recalculation is not triggered is that recalculation is not defined on the time account type "VACATION."

In some example embodiments, the database diagnostic engine 110 may be further configured to identify and/or perform one or more remedial actions to correct the errors present at the database 125. For instance, as shown in FIG. 3C, the user interface 140 may include a button 350 labeled "Fix Automatically." The database diagnostic engine 110 may respond to the selection of the button 350 by performing, for example, one or more remedial actions for correcting the error associated with the failure of the second check 340B. Furthermore, the database diagnostic engine 110 may repeat the first check 340A, the third check 340C, and/or the fourth check 340D in order to determine whether the errors present at the database 125 have been fixed and/or eliminated.

Figure 4:
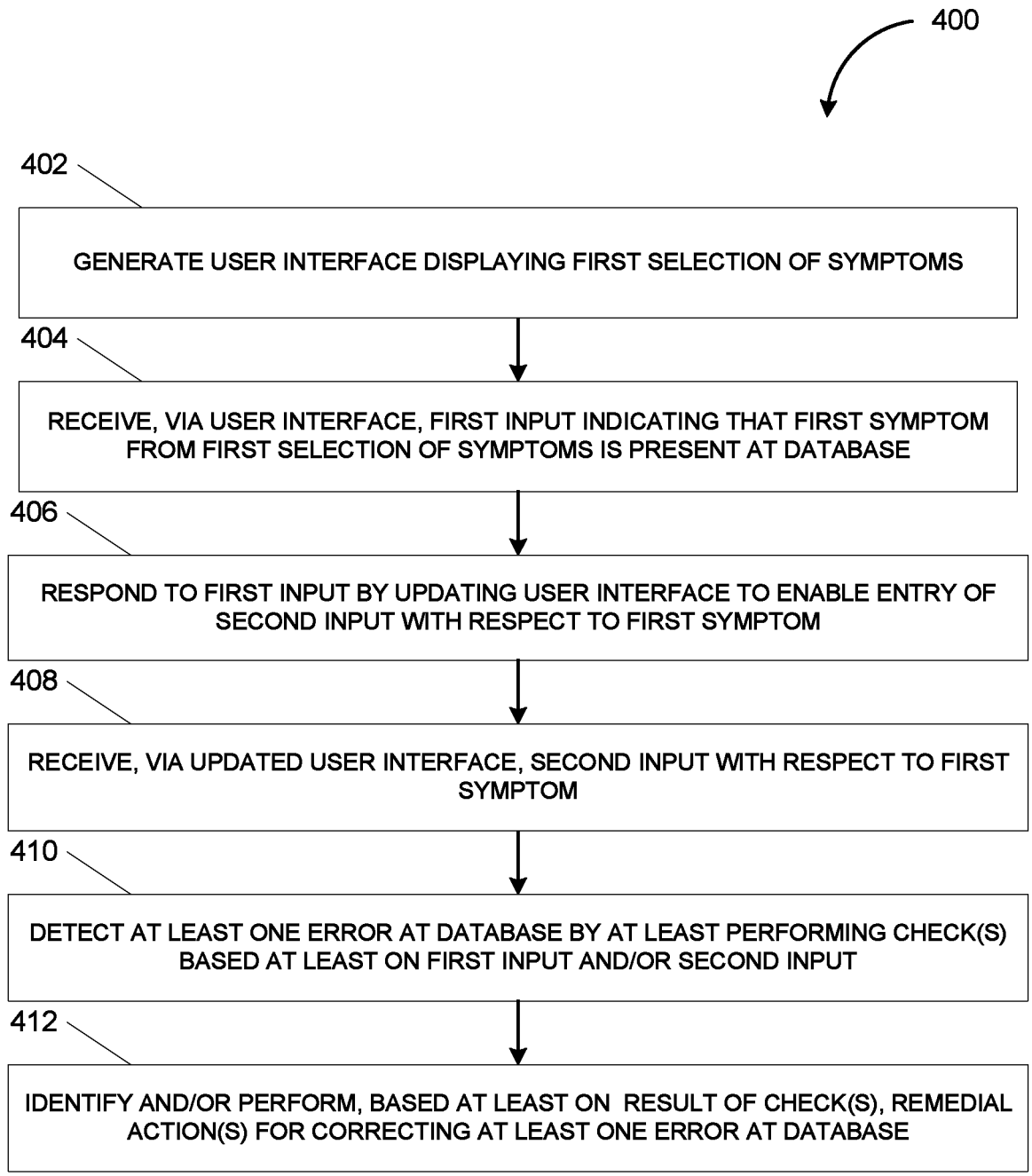
FIG. 4 depicts a flowchart illustrating a process for performing database diagnostics, in accordance with some example embodiments.

FIG. 4 depicts a flowchart illustrating a process 400 for performing database diagnostics, in accordance with some example embodiments. Referring to FIGS. 1-2, 3A-C, and 4, the process 400 may be performed by the database diagnostic engine 110.

At 402, the database diagnostic engine 110 may generate a user interface displaying a first selection of symptoms. For example, the database diagnostic engine 110 may generate the user interface 140 to display a first selection of symptoms including, for example, the first symptom 310A, the second symptom 310B, the third symptom 310C, and/or the fourth symptom 310D. The first symptom 310A, the second symptom 310B, the third symptom 310C, and/or the fourth symptom 310D may be symptoms exhibited by the malfunctioning database 125. As such, the user interface 140 may be further configured to receive one or more inputs indicating which one of the first symptom 310A, the second symptom 310B, the third symptom 310C, and/or the fourth symptom 310D are actually present at the database 125.

At 404, the database diagnostic engine 110 may receive, via the user interface, a first input indicating that a first symptom from the first selection of symptoms is present at a database. For instance, as shown in FIG. 3A, the user interface 140 may include the first checkbox 320A, the second checkbox 320B, the third checkbox 320C, and/or the fourth checkbox 320D. Selecting the first checkbox 320A may indicate to the database diagnostic engine 110 that the first symptom 310A is present at the database 125.

At 406, the database diagnostic engine 110 may respond to the input by at least updating the user interface to enable entry of a second input with respect to the first symptom. At 408, the database diagnostic engine 110 may receive, via the updated user interface, the second input with respect to the first symptom. For example, as shown in FIG. 3B, the database diagnostic engine 110 may respond to the selection of the first checkbox 320A by at least updating the user interface 140 to include the first text box 330A and/or the second text box 330B. The first text box 330A and/or the second text box 330B may be configured to receive parameters associated with the first symptom 310A including, for example, values (e.g., strings, integers, Booleans, and/or the like) that provide additional information with respect to the first symptom 310A. Alternatively and/or additionally, the database diagnostic engine 110 may respond to the selection of the first checkbox 320A by at least updating the user interface 140 to display a second selection of symptoms. The second selection of symptoms may include additional symptoms that may accompany the first symptom 310A. Here, the user interface 140 may be updated to receive additional inputs indicating that at least one of the second selection of symptoms is also present at the database 125.

At 410, the database diagnostic engine 110 may detect at least one error at the database by at least performing, based at least on the first input and/or the second input, one or more checks. For example, in some example embodiments, the database diagnostic engine 110 may perform one or more checks corresponding to the first symptom 310A and/or parameters associated with the first symptom 310A. Alternatively and/or additionally, the database diagnostic engine 110 may perform one or more checks corresponding to the at least one of the second selection of symptoms also present at the database 125. Performing the checks may identify at least one error present at the database 125 including, for example, data inconsistencies, misconfiguration, and/or the like.

At 412, the database diagnostic engine 110 may identify and/or perform, based at least on a result of the one or more checks, one or more remedial actions for correcting the at least one error at the database. In some example embodiments, the result of the one or more checks may identify the errors that are present in the database 125. Accordingly, the database diagnostic engine 110 may identify remedial actions for correcting these errors. Alternatively and/or additionally, the database diagnostic engine 110 may perform the remedial actions for correcting the errors. As shown in FIG. 3C, the database diagnostic engine 110 may update the user interface 140 to include the button 350. Selecting the button 350 may trigger the performance of remedial actions for correcting the errors that are present at the database 125. According to some example embodiments, the database diagnostic engine 110 may repeat at least some of the checks performed at operation 410 to determine whether the errors present at the database 125 have been fixed and/or eliminated.

Figure 5:
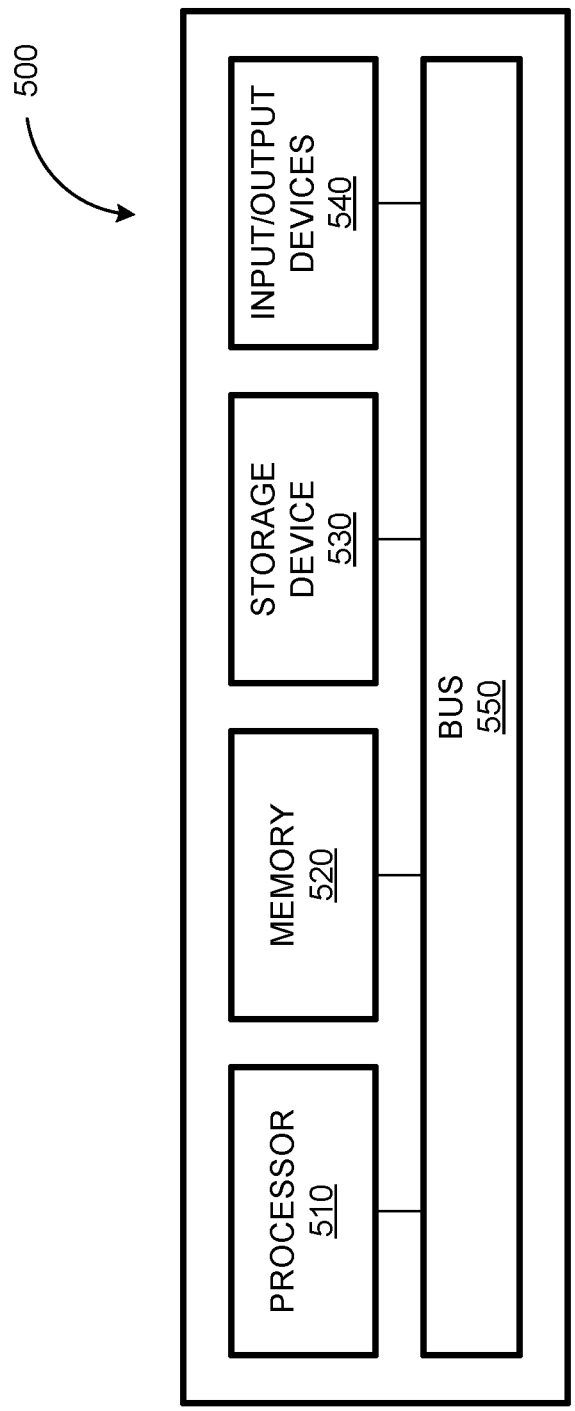
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database diagnostic engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database diagnostic engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A system, comprising:
at least one data processor; and
at least one memory storing instructions which, when executed by the at least one data processor, cause operations comprising:
generating, by a database diagnostic engine, a user interface for displaying, at a client, a first selection of symptoms;
receiving, from the client and via the user interface, a first input indicating that a first symptom from the first selection of symptoms is present at a database coupled with the client;
responding, by the database diagnostic engine, to the first input by at least updating the user interface to enable an entry of a second input with respect to the first symptom;
receiving, from the client and via the updated user interface, the second input with respect to the first symptom; and
performing, by the database diagnostic engine, one or more checks, the one or more checks being performed, based at least on the first input and/or the second input, to detect at least one error at the database.

2. The system of claim 1, wherein the user interface is updated to display a second selection of symptoms, wherein the second input comprises a selection of at least a second symptom from the second selection of symptoms, and wherein the second symptom comprises an additional symptom that is also present at the database along with the first symptom.

3. The system of claim 2, wherein the one or more checks are selected based at least on the one or more checks being configured to detect an error associated with the first symptom and/or the second symptom.

4. The system of claim 1, wherein the second input comprises one or more parameters associated with the first symptom.

5. The system of claim 4, wherein the one or more parameters comprises a string, an integer, a Boolean, a date, a time, and/or a real number.

6. The system of claim 4, wherein the one or more checks are selected based at least on the one or more checks being configured to detect an error associated the first symptom having the one or more parameters.

7. The system of claim 1, wherein the user interface comprises a graphic user interface and/or a chatbot.

8. The system of claim 1, wherein the user interface includes one or more checkboxes, text boxes, drop down menus, radio buttons, and/or buttons for receiving the first input.

9. The system of claim 1, further comprising:
performing, based at least on a result of the one or more checks, one or more remedial actions for correcting the at least one error at the database.

10. The system of claim 1, wherein the database diagnostic engine comprises cloud-based platform that is accessible to the client via a network.

11. A computer-implemented method, comprising:
generating, by a database diagnostic engine, a user interface for displaying, at a client, a first selection of symptoms;
receiving, from the client and via the user interface, a first input indicating that a first symptom from the first selection of symptoms is present at a database coupled with the client;

responding, by the database diagnostic engine, to the first input by at least updating the user interface to enable an entry of a second input with respect to the first symptom;

receiving, from the client and via the updated user interface, the second input with respect to the first symptom; and performing, by the database diagnostic engine, one or more checks, the one or more checks being performed, based at least on the first input and/or the second input, to detect at least one error at the database.

12. The method of claim 11, wherein the user interface is updated to display a second selection of symptoms, wherein the second input comprises a selection of at least a second symptom from the second selection of symptoms, and wherein the second symptom comprises an additional symptom that is also present at the database along with the first symptom.

13. The method of claim 12, wherein the one or more checks are selected based at least on the one or more checks being configured to detect an error associated with the first symptom and/or the second symptom.

14. The method of claim 11, wherein the second input comprises one or more parameters associated with the first symptom.

15. The method of claim 14, wherein the one or more parameters comprises a string, an integer, a Boolean, a date, a time, and/or a real number.

16. The method of claim 14, wherein the one or more checks are selected based at least on the one or more checks being configured to detect an error associated the first symptom having the one or more parameters.

17. The system of claim 11, wherein the user interface comprises a graphic user interface and/or a chatbot.

18. The method of claim 11, wherein the user interface includes one or more checkboxes, text boxes, drop down menus, radio buttons, and/or buttons for receiving the first input.

19. The method of claim 11, further comprising:

performing, based at least on a result of the one or more checks, one or more remedial actions for correcting the at least one error at the database.

20. A non-transitory computer-readable medium including instructions, which when executed by at least one data processor, cause operations comprising:

generating, by a database diagnostic engine, a user interface for displaying, at a client, a first selection of symptoms;

receiving, from the client and via the user interface, a first input indicating that a first symptom from the first selection of symptoms is present at a database coupled with the client;

responding, by the database diagnostic engine, to the first input by at least updating the user interface to enable an entry of a second input with respect to the first symptom;

receiving, from the client and via the updated user interface, the second input with respect to the first symptom; and performing, by the database diagnostic engine, one or more checks, the one or more checks being performed, based at least on the first input and/or the second input, to detect at least one error at the database.

* * * * *